3,310,481
REMOVAL OF RESIDUAL MONOMERIC SULFONATES FROM POLYMERIZATES THEREOF

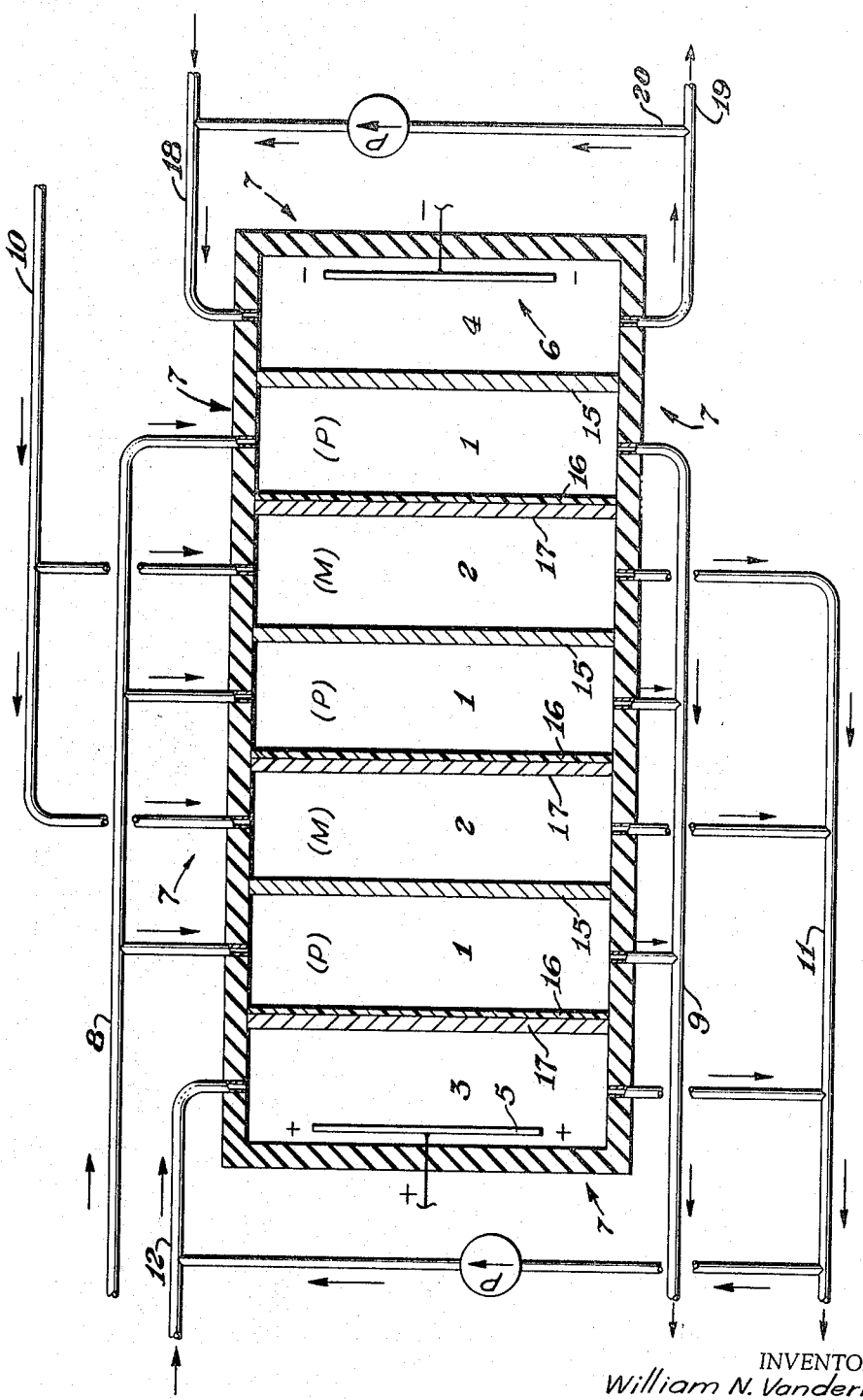

Richard A. Mock and William N. Vanderkooi, Midland, Mich., assignors to The Dow Chemical Company, Midland, Mich., a corporation of Delaware
Filed Sept. 10, 1962, Ser. No. 222,408
5 Claims. (Cl. 204—180)

The present invention concerns the removal of residual vinyl organic sulfonates from aqueous polymerizates thereof. More particularly, the invention concerns the removal of non-volatile vinyl organic sulfonates from aqueous dispersions of polyvinyl organic sulfonates by electrodialysis.

Present techniques for the removal of residual monomer in polymerizates of non-volatile vinyl organic sulfonates generally involve one or more operations such as precipitation, solvent extraction, or chemical destruction of the residual monomer. Such methods, in addition to incorporating impurities into the polymerizate, usually require large amounts of chemical reagents and, as a result, are rather costly operations.

A further characteristic of present techniques for the removal of vinyl organic sulfonates from polymerizates thereof is that the polymerization reaction is terminated prior to carrying out the separatory operations. It would be highly advantageous to provide a monomer separatory technique which could be utilized while simultaneously maintaining conditions conducive to polymerization. In such an operation, it would be possible to terminate the polymerization reaction simply by withdrawing the available monomer from the reaction system. The importance of such a method is illustrated by considering the unit operation of continuously polymerizing a vinyl organic sulfonate, e.g., sodium styrene sulfonate, in an aqueous dispersion until an optimum conversion is obtained, and thence withdrawing the monomer to terminate the polymerization reaction, providing thereby a polymer purified of non-volatile residual monomer and reusable monomer as separate products. Optimum conversions, insofar as the production of maximum molecular weight is concerned, will generally occur within the range of 65 to 90 percent conversion of monomer to polymer. In light of this fact, the advantages of terminating the reaction simply by withdrawing reusable monomer from the polymerizate when a desired conversion level has been achieved are manifest.

In view of the foregoing, it would be desirable, and is an object of the invention, to provide a novel method for the removal of non-volatile, residual monomer in aqueous polymerizates of vinyl organic sulfonates. A particular object is to provide a unit operation wherein polymerization is terminated at an optimum conversion and the polymerizate is substantially purified of the residual non-volatile monomer with the monomer thus separated from the polymerizate being reusable. A further object is to provide a continuous process for monomer removal that does not, as a prerequisite, require termination of the polymerization process. These and other objects, such as will become apparent hereinafter, are accomplished in accordance with the present invention.

In the present invention, vinyl organic sulfonate monomer is removed from aqueous polymerizates thereof by passing the liquid, aqueous polymerizate through a purification chamber of at least one electrodialyzing cell. A representative electrodialyzing cell comprises at least three adjacent, liquid containing chambers of which an intermediate one is the purification chamber through which the aqueous polymerizate to be stripped of residual monomer is passed. The chambers adjacent to the purification chamber are concentrating chambers which receive, respectively, anionic and cationic components of residual vinyl organic sulfonates stripped from the polymerizate processed through the purification chamber.

For the purpose of the invention, the purification chamber has at least one wall in common with one adjacent concentrating chamber, which wall is a combination, ion permeable membrane comprising an outwardly facing anion permselective membrane and an inwardly facing shield of an ion permeable, non-ionic membrane, and another wall in common with a second adjacent concentrating chamber, which wall is a cation permselective membrane. The concentrating chambers contain electrically separate volumes of a conducting aqueous electrolyte which may be simply a vinyl organic sulfonate. These volumes of electrolyte are in electrical communication with, on the cation permselective membrane side of the purification chamber, a cathode, and, on the anion permselective side, an anode.

When the electrodialyzing cell is in operation, the polymerizate is passed through the purification chamber and an electromotive force is unidirectionally impressed upon the cell whereby residual vinyl organic sulfonate is removed from the aqueous polymerizate in the purification chamber, any cationic metal ions present passing through the cation permselective membrane toward the cathode and the vinyl organic sulfonate anion passing, along with any other anionic impurities, through the anion permselective membrane toward the anode. The anionic polymer remains in the purification chamber by reason of its molecular size.

Aqueous polymerizates to be processed in accordance with the invention include aqueous solutions or dispersions of polyvinyl organic sulfonates, i.e., polyalkane polymers having attached along the polymer chain a plurality of sulfonate substituents. The polyvinyl organic sulfonates include homopolymers and copolymers of water-soluble, vinyl organic sulfonates, as well as water-soluble copolymers of the sulfonates with other ethylenically unsaturated monomers. In any event, the polymers contain sufficient hydrophilic substituents, either in the form of the sulfonate group or combinations of this group with other hydrophilic substituents, to provide at least a water-dispersible, if not completely water-soluble polymer. By this is meant that the polyvinyl organic sulfonate forms a visually homogeneous and infinitely dilutable solution or dispersion in water.

Illustrative vinyl organic sulfonates that may be employed to prepare aqueous polymerizates to be processed in accordance with the invention include vinyl aromatic sulfonates of the general formula:

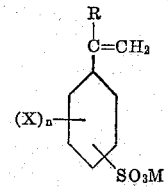

wherein R is hydrogen, methyl, or a halogen, X is an alkyl group containing from 1 to 8 carbons, a halogen atom or a hydroxyl group and $n$ is 0 or a whole number from 1 to 3. M is hydrogen or a cationic salt forming group such as an alkali metal, alkaline earth metal, or ammonium ion.

Still other vinyl aromatic sulfonates have the following general formula:

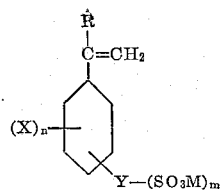

wherein the symbols, R, X, M and $n$ are as defined above and Y is an aliphatic saturated or unsaturated hydrocarbon group having from 1 to 4 carbons and $m$ is 1 or 2.

Further vinyl organic sulfonates include the ethylenically unsaturated sulfonates which may be represented by the general formula:

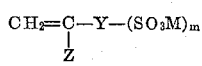

in which Z may be hydrogen or a group such as halogen, carboxyl, sulfo, cyano, carbamyl, nitro, aryl, e.g., phenyl, tolyl, etc., or one of the radicals, —COOR, —COR, —CONR$_2$, —OR and RCOO—, in which R may be any organic hydrocarbon group, aliphatic or aromatic, saturated or unsaturated, but is preferably an alkyl group of from 1 to 5 carbons. Otherwise the symbols Y, M and $m$ are as defined above.

For numerous specific illustrations of water-soluble vinyl organic sulfonates within the above formulas, see columns 3-13 of U.S. Patent 2,527,300.

Vinyl organic sulfonates preferred for preparing the soluble aqueous polymerizates include the alkali metal salts of ortho-, meta-, or para-styrene sulfonic acids, alkali metal salts of ortho-, meta-, or para-isopropylbenzene sulfonic acids, alkali metal salts of ortho-, meta-, or para-vinyl phenyl methane sulfonic acids, alkali metal salts of ortho-, meta-, or para-vinyl phenyl ethane sulfonic acids. Preferred aliphatic sulfonates include the alkali metal salts of ethylene sulfonic acid, 1-bromoethylene sulfonic acid, 1-cyanoethylene sulfonic acid, 1-phenyl ethylene sulfonic acids, 1-isopropyl ethylene sulfonic acid and 2-propene sulfonic acid.

Other polymerizates that can be processed in accordance with the invention include copolymers of the above with such comonomers as the various monoethylenically unsaturated organic compounds known to copolymerize with styrene. Hydrophobic comonomers include, in addition to styrene, vinyl toluene, vinyl xylene, ethyl styrene, acrylonitrile, methacrylonitrile, methyl methacrylate, ethylmethacrylate, vinyl acetate, vinyl formate, vinyl methyl ether, vinyl chloride, vinylidene chloride, ethyl maleate, maleic anhydride, and the like ethylenically unsaturated hydrophobic organic monomers. When the only comonomers used are hydrophobic, the vinyl organic sulfonate should constitute at least about 40 mole percent of the final polymerized product in order to insure that it is water soluble.

If a comonomer is hydrophilic, however, even larger amounts of the various comonomers can be used with the vinyl organic sulfonates to provide a water-soluble product. Illustrative hydrophilic comonomers include maleic acid, acrylic acid, itaconic acid, vinyl benzoic acid, and alkali metal and ammonium salts of the foregoing acids. Other hydrophilic monomers are acrylamide, methacrylamide, N-aminoethyl acrylate, N,N'-dimethylaminoethyl methacrylate, vinyl pyrrolidone, N-vinyl oxazolidone, N-vinyl-N-methyl formamide, N-vinyl formamide, N-vinyl acetamide, and vinylbenzyl trimethyl ammonium chloride. With the use of the hydrophilic comonomers, the copolymers may be prepared with as much as 95 mole percent of one or more of such comonomers.

The above described homo- and copolymers of the vinyl organic sulfonates are prepared in an aqueous medium in the presence of polymerization initiating agents. For example, sufficient vinyl organic sulfonate, with or without a comonomer, is added to an aqueous polymerization system to provide from about 0.05 up to as much as 40 percent by weight total monomer. Subsequently, the system is caused to polymerize upon the addition of a chemical free radical catalyst or upon the application of high energy ionizing radiation. While polymerization can be achieved at temperatures as low as the freezing point of the solution, elevated temperatures within the range from about 40° to 100° C. are preferred. Amounts of chemical catalyst used vary according to the desired ultimate molecular weight. Upon achieving the desired degree of conversion, heating of the reaction system is terminated and the aqueous polymerizate processed in accordance with the invention. While it is permissible to use other means to terminate the polymerization reaction, e.g., inhibitors, exposure to oxygen and the like, the deleterious influence of these termination means is avoided by withdrawing the monomer from the polymerizate in accordance with the invention when a desired conversion has been achieved.

Although the aqueous polymerizate can be passed directly into the purification chamber of the electrodialysis unit in the "as-polymerized form," it is preferred procedure to first incorporate into the aqueous polymerizate a quantity of a water-miscible organic cosolvent for the polymer. It has been discovered that certain cosolvents are unique in that they reduce the viscosities of aqueous solutions of the polymerizate and thereby produce significant increases in the rate of monomer removal in accordance with the invention. Specific water-miscible organic cosolvents, which uniquely promote accelerated monomer removal rates include pyridine, acetone, tetrahydrofuran, dioxane, n-propanol, isopropanol, diethylamine, trimethylamine and diethylene glycol diethyl ether. From as little as 5 percent up to as much as about 60 percent of the aforementioned organic cosolvents decrease the solution viscosity of the polymerizate to as little as 20 percent of the original viscosity of the polymer in water alone.

The manner of operation and construction of conventional electrodialyzing cells and combinations thereof are known to the art. For instance, various apparatus modifications and process improvements for the utilization thereof are illustrated in United States Patents to W. E. Katz et al., 2,694,680; E. J. Roberts, 2,799,638; N. W. Rosenberg, 2,937,126; and N. R. Matz et al., 3,029,196. Cation and anion permselective membranes are described by W. Juda et al. in U.S. Patent 2,636,851. Improved cation permselective membranes are taught by J. T. Clarke in U.S. Patents 2,731,408, 2,731,411 and 2,756,202.

While the above procedures and materials are, as will be apparent to those skilled in the art, generally applicable to the present invention, it is essential to modify the purification (dilution) chambers of the electrodialysis cells described in these patents for employment in the present invention by superimposing an ion permeable, non-ionic membrane between the purification chamber and the anion permselective membrane so as to shield it from the aqueous polymerizate to be purified of residual monomer. The non-ionic membrane may be either a coating on the anion permselective membrane, or an entirely separate membrane adjacent thereto shielding the anion permselective membrane from the interior of the purification chamber. This prevents contact, and thereby detrimental interaction, between the anion permselective membrane and the polyvinyl organic sulfonate to be purified.

Membranes or membrane coatings which may be used to shield the anion permselective membranes from a vinyl organic sulfonate polymerizate solution include water-insolubilized, but ion permeable, bibulous films or coatings of non-ionic cellulose ethers such as methyl cellulose ethers, hydroxyethyl cellulose ethers, mixed methyl hydroxyethyl cellulose ethers and mixed methyl hydroxypropyl cellulose ethers. Other suitable membranes are the regenerated cellulose materials such as cellophane. In addition to the cellulose based films, water-insolubilized films of polymers prepared by interpolymerizing a difunctional vinyl monomer, e.g., divinylbenzene, with a non-ionic hydrophilic monomer can also be used. Suitable non-ionic monomers are represented by the vinyl alcohols, vinyl ethers, N-vinyl pyrrolidone, N-vinyl oxazolidone and substituted derivatives of the foregoing.

For the purpose of specific illustration, particular ion permeable, non-ionic membrances can be prepared by chemically cross-linking conventional water-soluble films of water-soluble ethers, e.g., hydroxyethyl cellulose ether, methyl cellulose ether, hydroxypropyl methyl cellulose ether, with small amounts, e.g., 0.1 to 1 percent by weight of the ether, of glyoxal or a dicarboxylic acid, to provide partially cross-linked, water-insoluble but yet ion permeable bibulous membranes. Numerous other bibulous, non-ionic organic membranes, such as those prepared from naturally occurring organic materials, conventionally employed in dialysis operations can also be utilized effectively as the insulating shield for the anion permselective membrane.

An illustrative embodiment of an electrodialysis cell that can be employed to advantage in the present process is illustrated in the accompanying drawing wherein purification chambers 1 (P) are alternately disposed with respect to monomer concentrating chambers 2 (M), each of the interior chambers having two walls in common with adjacent chambers. While only three purification and correspondingly two monomer concentrating chambers are illustrated, as many as a hundred or more of such alternating chambers can be used in a series similar to that illustrated, so long as electroconductivity is maintained in each chamber by means of a suitable electrolyte. The anode chamber 3 and the cathode chamber 4 contain appropriate electrodes 5 and 6, respectively, for impressing a unidirectional current through the cell. Separating the chambers are a combination of a non-ionic, ion permeable shielding membrane 16 and an anion permselective membrane 17 and a cation permselective membrance 15. The interior chambers are otherwise bounded by insulating side walls 7.

The aqueous polymerizate to be purified of residual vinyl organic sulfonate is introduced into polymerizate purification chambers 1 through the influent manifold 8 of the purification circulatory system. The effluent solutions from the purification chambers are withdrawn through a manifold 9 to be passed through successive cells, recycled, or removed from the unit. Dialyzed monomer is collected in the monomer concentrating chambers 2 and subsequently discharged into the monomer manifold 11. From there, it may be recycled through monomer recycle line 10, wasted, or supplied to a monomer recovery unit. Usually, a portion of the monomer recycle is passed through the anode chamber 3 by means of an anode electrolyte feed line 12. While any convenient conducting electrolyte such as the monomer concentrate can be used in the cathode chamber, the illustrated system utilizes inorganic ionic salts charged through anode feed line 18 and wasted through the anode discharge line 19 or recycled to the cathode chamber through the cathode recycle line 20. Wasting of the cathode chamber electrolyte is necessary since hydroxides of any metals present in the polymerizate will tend to concentrate there. If a concentration of these materials builds up in the cathode chamber recirculating stream to a point at which precipitation begins to occur, additional water or dilute electrolyte is added through the cathode feed line 18.

In a specific embodiment of the invention, a polymerizate of sodium styrene sulfonate was obtained by polymerizing sodium styrene sulfonate in 3 percent aqueous solution under a vacuum until about 71 percent conversion of monomer to polymer was achieved. At this conversion, the polymer was found to have a maximum molecular weight for a given set of polymerization conditions. Polymerization was terminated at this point by exposing the reaction mass to oxygen. The resulting sodium polystyrene sulfonate was estimated to have a molecular weight of about 1.5 million.

Four liters of the aqueous polymerizate and four liters of additional deionized water were mixed together and subsequently processed in a laboratory electrodialysis unit containing 20 pairs of alternating cation and anion permselective membranes, with appropriate insulating spacers and electrodes at each end of the stacked membranes. The dialysis unit employed was an "Ionics Electrolytic Demineralizer Laboratory Cell." Prior to use, thin sheets of cellophane were inserted into the electrodialysis unit so as to shield the anion permselective membranes from the interior of the purification chambers. This prevented detrimental interaction between the anion permselective membrane, which is electrically cationic in nature, with the polyvinyl organic sulfonate polyanions of the polymerizate.

A volume of water was circulated and recycled through every other chamber in the unit (concentrating chambers) while a volume of the above prepared aqueous polymerizate was circulated and recycled through the remaining alternate chambers (purification chambers). A potential of 25 volts of direct current was impressed upon the multiple concentration cell and this resulted in a current of 0.15 ampere. In any one purification chamber, the applied E.M.F. caused sodium cations, and other cationic impurities, in the aqueous polymerizate to diffuse toward the cathode through the catonic permselective membrane into a water stream contained in a monomer concentrating chamber and styrene sulfonate anions to diffuse toward the anode through anionic permselective membranes into another water stream contained in a second monomer concentration chamber. Periodically during the operation of the dialyzer in which all streams were continuously recycled, samples of the effluent streams were analyzed to determine their monomer and polymer contents. The following table shows the monomer concentrations in the purification chamber and monomer concentrate effluent streams as well as "polymer purity" (weight percent of total solids constituted by polymer), as a function of operating time.

TABLE 1

| Operating Time, Hours | Purification Chamber Effluent | | Monomer Concentrate Effluent, Monomer Conc., gms./100 ml. |
|---|---|---|---|
| | Monomer Conc., gms./100 ml. | "Polymer Purity," Percent | |
| 0.5 | 0.43 | 88 | 0.03 |
| 2.4 | 0.31 | 90.5 | 0.15 |
| 4.2 | 0.27 | 92.1 | 0.22 |
| 8.7 | 0.13 | 95.9 | 0.40 |
| 11.7 | 0.03 | 99.1 | 0.5 |
| 17.7 | 0.01 | 99.6 | -------- |

The data illustrate the transfer of residual monomer sulfonate salts from the polymer stream to the water stream thereby purifying the remaining polymer solution which, though ionic in nature, does not pass through the membrane walls of the polymerizate purification chamber. While rather extended recirculation times are employed in the example, these residence times within any one dialysis cell can be substantially reduced by increasing the number of cell stages through which the aqueous polymerizate flows. Adaptation of the above closed dialysis process to a continuous feed basis can be readily carried out simply by equalizing polymerizate feed rates with withdrawal (wasting) rates at a level corresponding to the desired polymer purity.

In other operations another sodium styrene sulfonate polymeric product prepared in a similar manner to that described above was dissolved in a mixture of 40:60 parts by volume of acetone to water. The resulting solution contained 2.5 grams of monomer per 100 milliliters of solution and 5.8 grams of polymer per 100 milliliters of solution. A comparable solution with water as the sole solvent was too viscous and impossible of practical dialysis.

A potential of 80 volts D.C. was applied to the electrodes and the cosolvent polymerizate stream passed through the dialyzer at a rate of 10 milliliters per minute. The temperature ranged between 50° and 80° C. The total volume of solution purified was 3.6 liters. The following table contains the monomer concentration in the polymer effluent stream as a function of operating time in hours.

TABLE 2

| Operating Time, Hours | Purification Chamber Effluent | |
|---|---|---|
| | Monomer Conc., gms./100 ml. | "Polymer Purity," Percent |
| 1.0 | 1.06 | 77.4 |
| 3.1 | 0.61 | 85.6 |
| 6.3 | 0.27 | 93.4 |
| 10.2 | 0.07 | 98.0 |
| 13.5 | 0.05 | 98.7 |

In a manner similar to that of the foregoing operation other cosolvents such as pyridine, tetrahydrofuran, dioxane, n-propanol, isopropanol, diethylamine, trimethylamine and diethylene glycol diethyl ether, are substituted for the acetone to provide dialyzable polymerizate purification can be accelerated by a factor of at least two times that in the presence of water alone.

Further operations are conducted according to procedures identical to those described in the first of the above operations except that the aqueous polymerizate is fed directly to the electrodialysis cell without terminating the polymerization reaction. Subsequently, reaction conditions conducive to polymerization of the styrene sulfonate are maintained in the polymerizate stream until substantially all of the available monomer has been withdrawn.

What is claimed is:

1. A method which comprises passing an aqueous dispersion of a polyvinyl organic sulfonate containing residual amounts of vinyl organic sulfonate through the purification chamber of at least one electrodialysis cell, said purification chamber having one wall of a cation permselective membrane and another wall of an anion permselective membrane inwardly shielded on the purification chamber side with an ion permeable non-ionic membrane, each of said walls being in contact with adjacent but electrically separate volume of an aqueous electrolyte, the electrolyte in contact with the cation permselective membrane being in electrical communication with a cathode and the aqueous electrolyte in contact with the anion permselective membrane being in electrical communication with an anode and, while passing the dispersion through the purification chamber, impressing a direct current unidirectionally through the electrodialysis cell, whereby monomer is removed from the aqueous polymerizate.

2. A method as in claim 1 wherein the aqueous dispersion of the polyvinyl organic sulfonate comprises an aqueous dispersing medium consisting of water and 5 to 60 percent by weight of the total medium of a water-miscible, organic cosolvent selected from the group consisting of pyridine, acetone, tetrahydrofuran, dioxane, n-propanol, isopropanol, diethylamine, trimethylamine and diethylene glycol diethyl ether.

3. A method as in claim 1 wherein the polyvinyl organic sulfonate is an alkali metal polyvinyl styrene sulfonate.

4. A method as in claim 1 wherein the aqueous dispersion contains from about 0.05 up to 40 percent by weight polyvinyl organic sulfonate and vinyl organic sulfonate.

5. A process which comprises passing an aqueous solution comprising from about 0.05 up to 40 percent by weight of an alkali metal polystyrene sulfonate and alkali metal styrene sulfonate solids through the purification chamber of at least one electrodialysis cell, said purification chamber having one wall of a cation permselective membrane and another wall of an anion permselective membrane inwardly shielded on the purification chamber side with an ion permeable non-ionic membrane, each of said walls being in contact with adjacent but electrically separate volumes of an aqueous electrolyte, the electrolyte in contact with the cation permselective membrane being in electrical communication with a cathode and the aqueous electrolyte in contact with the anion permselective membrane being in electrical communication with an anode and, while passing the dispersion through the purification chamber, impressing a direct current unidirectionally through the electrodialysis cell, whereby alkali metal styrene sulfonate is removed from the aqueous polymerizate.

References Cited by the Examiner

UNITED STATES PATENTS

| 2,758,965 | 8/1956 | Block et al. | 204—180 |
| 2,815,320 | 12/1957 | Kollsman | 204—180 |
| 2,897,130 | 7/1959 | Van Dorsser et al. | 204—301 |
| 2,970,098 | 1/1961 | Ellis | 204—301 |
| 2,981,671 | 4/1961 | Griffiths | 204—180 |
| 3,003,940 | 10/1961 | Mason et al. | 204—180 |
| 3,017,338 | 1/1962 | Butler et al. | 204—98 |
| 3,230,162 | 1/1966 | Gilchrist | 204—181 |

FOREIGN PATENTS 877,239  9/1961  Great Britain.

JOHN H. MACK, *Primary Examiner.*

JOHN R. SPECK, *Examiner.*

G. E. BATTIST, E. ZAGARELLA,
*Assistant Examiners.*